(12) United States Patent
Peng (10) Patent No.: US 7,077,688 B2
(45) Date of Patent: Jul. 18, 2006

(54) CABLE MANAGER

(76) Inventor: Yuan-Huei Peng, 4F., No. 12, Lane 270, Sec. 3, Pei Shen Rd., Shen Keng Shiang, Taipei (TW) 222

( * ) Notice: Subject to any disclaimer, the term of this patent is extended or adjusted under 35 U.S.C. 154(b) by 0 days.

(21) Appl. No.: 10/899,849

(22) Filed: Jul. 27, 2004

(65) Prior Publication Data

US 2005/0106948 A1 May 19, 2005

(30) Foreign Application Priority Data

Nov. 13, 2003 (TW) .............................. 92220133 U (51) Int. Cl.
*H01R 13/58* (2006.01)
(52) U.S. Cl. ...................................... 439/471; 248/68.1
(58) Field of Classification Search ................ 439/450, 439/452, 453, 470, 471, 472; 248/68.1, 74.2; 174/135
See application file for complete search history.

(56) References Cited

U.S. PATENT DOCUMENTS

| | | | |
|---|---|---|---|
| 3,363,864 A * | 1/1968 | Olgreen ..................... 248/68.1 |
| 3,890,459 A * | 6/1975 | Caveney ..................... 174/101 |
| 4,244,544 A * | 1/1981 | Kornat ....................... 248/68.1 |
| 4,579,310 A * | 4/1986 | Wells et al. ................. 248/544 |
| 4,840,333 A * | 6/1989 | Nakayama ................ 248/68.1 |
| 5,085,384 A * | 2/1992 | Kasubke ........................ 248/62 |
| 5,168,999 A * | 12/1992 | Lee et al. .................... 206/420 |
| 5,209,441 A * | 5/1993 | Satoh ......................... 248/74.2 |
| 5,277,006 A * | 1/1994 | Ruster ....................... 52/220.7 |
| 5,307,243 A * | 4/1994 | Sharp et al. ................. 361/826 |
| 5,460,342 A * | 10/1995 | Dore et al. ................. 248/74.2 |
| 5,566,269 A * | 10/1996 | Eberle et al. ................ 385/137 |
| 5,588,683 A * | 12/1996 | Schliessner ................... 285/62 |
| 5,607,126 A * | 3/1997 | Cordola et al. ............. 248/68.1 |
| 5,731,546 A * | 3/1998 | Miles et al. ................. 174/135 |
| 5,743,497 A * | 4/1998 | Michael ..................... 248/68.1 |
| 5,862,291 A * | 1/1999 | Stockman et al. .......... 385/136 |
| 5,918,837 A * | 7/1999 | Vicain ......................... 248/49 |
| 5,921,402 A * | 7/1999 | Magenheimer .............. 211/26 |
| 5,954,300 A * | 9/1999 | Sturies et al. .............. 248/68.1 |
| 5,954,301 A * | 9/1999 | Joseph et al. .............. 248/68.1 |
| 6,077,113 A * | 6/2000 | Lecomte ................... 439/540.1 |
| 6,118,075 A * | 9/2000 | Baker et al. .............. 174/72 A |
| 6,170,784 B1 * | 1/2001 | MacDonald et al. .......... 248/65 |
| 6,216,320 B1 * | 4/2001 | Schauermann ............... 24/458 |
| 6,223,909 B1 * | 5/2001 | Mendoza ....................... 211/26 |
| 6,241,198 B1 * | 6/2001 | Maruyama .................... 248/49 |
| 6,285,565 B1 * | 9/2001 | .ANG.berg et al. ......... 361/826 |
| 6,423,898 B1 * | 7/2002 | Croker ........................ 174/50 |
| 6,427,953 B1 * | 8/2002 | Dickens .................... 248/68.1 |
| 6,438,309 B1 * | 8/2002 | Franz ......................... 385/135 |
| 6,477,770 B1 * | 11/2002 | Dickens ...................... 29/868 |
| 6,513,764 B1 * | 2/2003 | Koziol ...................... 248/68.1 |
| 6,568,542 B1 * | 5/2003 | Chen .......................... 211/26 |
| 6,585,196 B1 * | 7/2003 | Nakanishi .................. 248/68.1 |
| 6,605,782 B1 * | 8/2003 | Krietzman et al. ......... 174/101 |
| 6,702,237 B1 * | 3/2004 | Rubenstein et al. ....... 248/68.1 |
| 6,728,461 B1 * | 4/2004 | Senatore et al. ........... 385/135 |
| 6,742,746 B1 * | 6/2004 | La Scola et al. ............. 248/49 |
| 6,766,093 B1 * | 7/2004 | McGrath et al. ........... 385/134 |
| 6,818,834 B1 * | 11/2004 | Lin ............................ 174/135 |
| 6,883,762 B1 * | 4/2005 | Miura et al. ............... 248/74.2 |

* cited by examiner

*Primary Examiner*—Ross Gushi
(74) *Attorney, Agent, or Firm*—Allen, Dyer, Doppelt, Milbrath & Gilchrist, P.A.

(57) ABSTRACT

A cable manager includes a body and a cable clamping device integrally formed on the body. The cable clamping device has a pair of clamping pieces forming a space and an opening therein, and the space having a reception width and the opening having an opening width. The opening width is relatively smaller than the reception width.

4 Claims, 8 Drawing Sheets

CABLE MANAGER

FIELD OF THE INVENTION

The present invention is related to a cable manager, and more particularly, to a cable manager for use in internet wiring accessories.

BACKGROUND OF THE INVENTION

Figure 11:
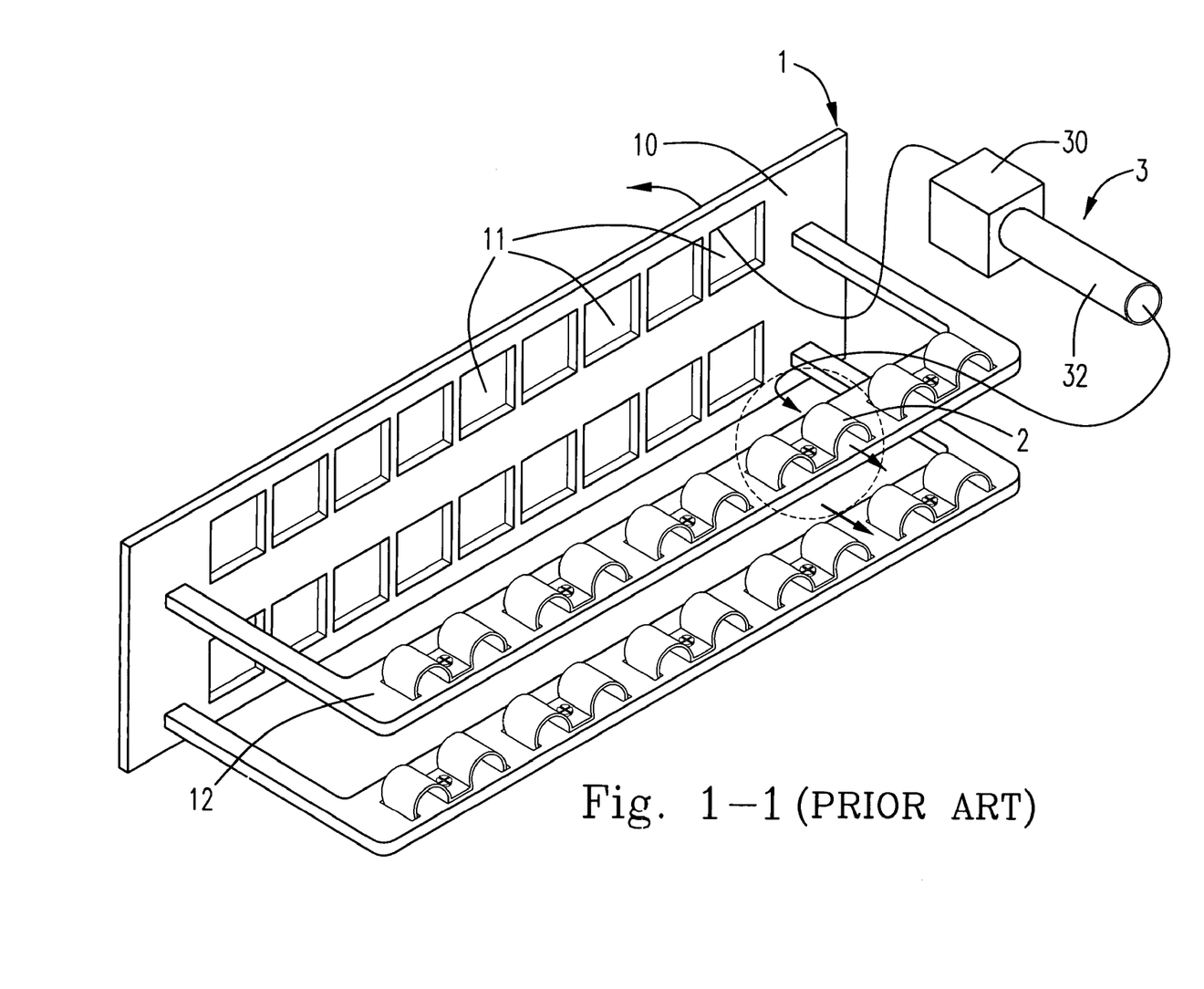

Please refer to FIG. 1-1. FIG. 1-1 is a schematic view showing a conventional wiring device. The wiring device 1 has a panel 10 including a plurality of wiring holes 11. The wiring device 1 further has a cable manager 12 extended therefrom and having plural clampers 2 for fixing a cable 3 on the cable manager 12. The clamper 2 clamps the wire portion 32 of the cable 3 and a connector 30 thereof is placed in the wiring hole 11.

Figure 12:
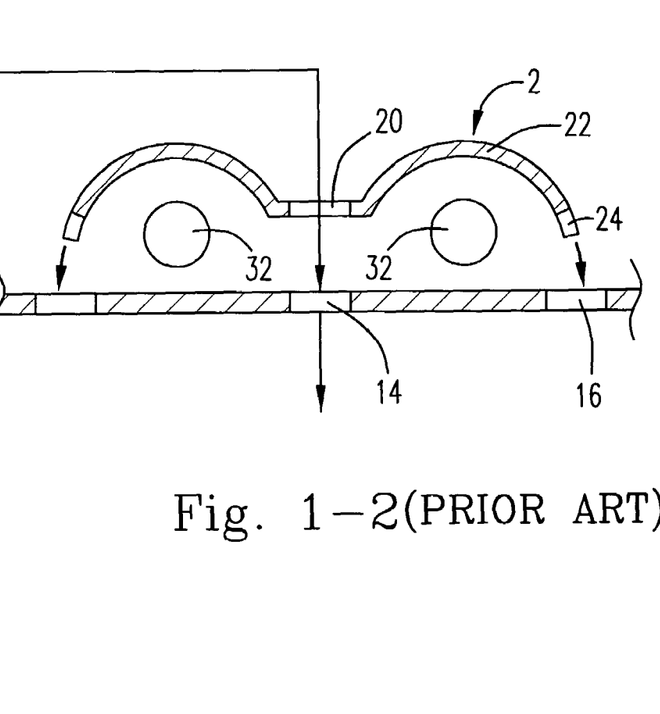

Please refer to FIG. 1-2. FIG. 1-2 is a sectional view of the conventional clamper. In FIG. 1-2, the clamper 2 is a very early design which is often made by metal, and has a pressing portion 22 at the laterals of the clamper 2. The pressing portion 22 presses the cable 3 on the cable manager 12 and a protrusion 24 is extended from an end of the pressing portion 22. The cable manager 12 has a placing aperture 16 for receiving the protrusion 24 when the clamper 2 is combined with the cable manager 12. The screw 4 fixes the clamper 2 on the cable manager 12 through a fixing hole 20 and a screw hole 14. Therefore, the clamper 2 is firmly fixed on the cable manager 12.

Figure 13:
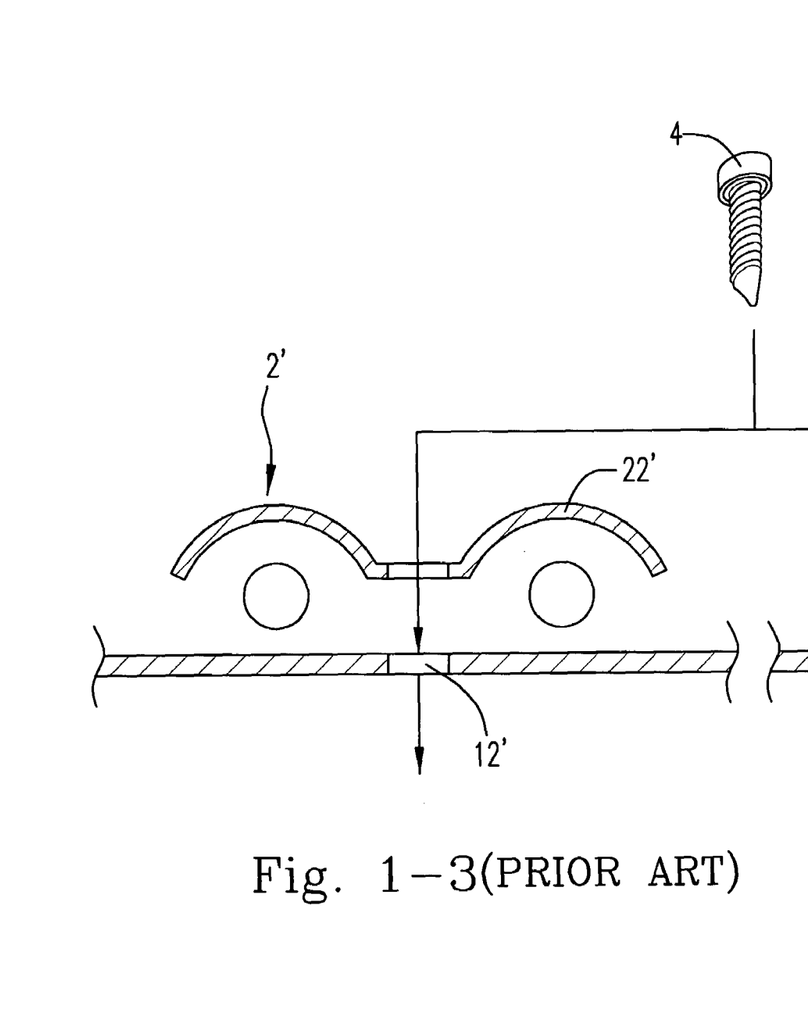

Please refer to FIG. 1-3. FIG. 1-3 is a sectional view of another conventional clamper 2' modified from the clamper 2 of FIG. 1-2. The protrusion 24 has been canceled because the pressing portion 22 is enough to secure the wire portion 32 firmly attached to the cable manager 12'. Since a step for penetrating the aperture 16 becomes unnecessary, the whole process for manufacturing the clamper 2' is simplified. Furthermore, the screw hole 14 in FIG. 1-2 and FIG. 1-3 can be manufactured directly by the screw 4 boring through the cable manager 12.

However, even though the conventional wiring device 1 is capable for firmly fixing the cable, the capability is useless. This is because the environment where the wiring device 1 adapted in usually is not too harsh, especially for an indoor environment. So, it is unnecessary and consumptive to use a screw 4 to fix a clamper 2 on a cable manager 12. Most importantly, the step of using the screw 4 to fix the cable 3 on the cable manager 12 is time consuming. First, the worker has to place one or two cable 3 beside the screw hole 14. Second, the clamper 2(2') is attached onto the cable 3. Third, the clamper 2(2') is moved to let the fixing hole 20 be right above the screw hole 14. Finally, the screw 4 is screwed onto the cable manager 12 by the screwdriver (not shown in all figures). Therefore, it is clear that the step is very troublesome and time-consuming. Furthermore, it is inconvenient to use the screw driver in a straight place. Therefore, the above-mentioned disadvantages of the conventional wiring device needs to be resolved.

SUMMARY OF THE INVENTION

It is an object of the present invention to provide a cable manager to save time and resources, which is capable of being assembled fast and without wasting materials.

According to one aspect of the present invention, a cable manager includes: a body and a cable clamping device integrally formed on the body and having a pair of clamping pieces forming a space and an opening. The space has a reception width and the opening has an opening width and the opening width is relatively smaller than the reception width.

In accordance with the present invention, the body further includes a fixing aperture for receiving therein a cable tie.

Preferably, the opening has a receiving direction perpendicular to a surface of the body.

Preferably, the cable manager according to the present invention further includes a supporting portion to support the body.

Preferably, the supporting portion is a fixing and engaging device.

Preferably, the supporting portion further has a through hole.

Preferably, the cable manager according to the present invention further includes plural cable clamping device placed on two surfaces of the body.

According to another aspect of the present invention, a cable manager includes: a body, and a plurality of cable clamping device integrally formed on the body, each of which has a clamping piece forming a space and an opening, and a fixing aperture formed on the body. The space has a reception width and the opening has a opening width and the reception width is relatively larger than the opening width.

In accordance with the present invention, the cable manager further includes a supporting portion to support the body.

In accordance with the present invention, the supporting portion further has a through hole.

In accordance with the present invention, the opening has a receiving direction parallel to a surface of said body.

The foregoing and other features and advantages of the present invention will be more clearly understood through the following descriptions with reference to the drawings, wherein:

BRIEF DESCRIPTION OF THE DRAWINGS

FIG. 1-1 is a schematic view showing a conventional wiring device;

FIG. 1-2 is a sectional view of the conventional clamper;

FIG. 1-3 is a sectional view of another conventional clamper modified from the clamper of FIG. 1-2;

FIG. 2-1 is a schematic view showing the cable manager according to a preferred embodiment of the present invention;

FIG. 2-2 is a schematic view showing another cable manager having a fixing aperture according to another preferred embodiment of the present invention;

FIG. 2-3 is a schematic view showing another cable manager having a fixing aperture according to another preferred embodiment of the present invention;

FIG. 2-4 is a sectional view showing the cable clamping device having a different clamping piece according to another preferred embodiment of the present invention;

DETAILED DESCRIPTION OF THE PREFERRED EMBODIMENT

The present invention will now be described more specifically with reference to the following embodiments. It is to be noted that the following descriptions of preferred embodiments of the invention are presented herein for purpose of illustration and description only; it is not intended to be exhaustive or to be limited to the precise form disclosed.

The present invention will now be described more specifically with reference to the following embodiments.

Figure 21:
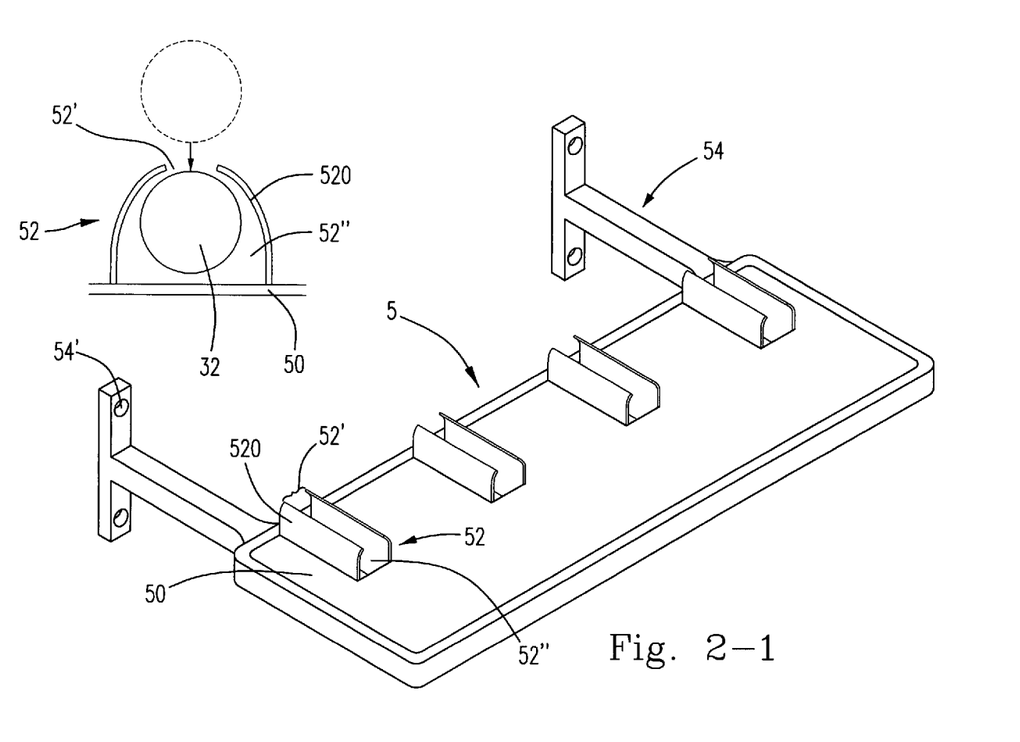

Please refer to FIG. 2-1. FIG. 2-1 is a schematic view showing the cable manager according to a preferred embodiment of the present invention. The cable manager 5 includes a body 50. The body 50 has a cable clamping device 52 integrally formed on the body 50. The cable clamping device 52 has a pair of clamping pieces 520 forming a space 52" and an opening 52'. The receiving direction of the opening 52' is perpendicular to the surface of the cable manager 5. During the assembling, the wire portion 32 is directly pressed through the opening 52' into the space 52". Clearly, introducing the screw 4 to fix the clamper 2 on the conventional cable manager 12 of the conventional wiring device shown in FIG. 1-2 and FIG. 1-3 is unnecessary in the present invention. Therefore, the time for assembling the wire portion 32 onto the cable manager 5 is much shorter and resources are saved.

Please refer to FIG. 2-1. The body 50 further has a supporting portion 54 having a through hole 54'. By screwing the screws (not shown in figures) on the through hole 54', the cable manager 5 is fixedly placed on the wiring panel 1' (shown in FIG. 3).

Figure 22:
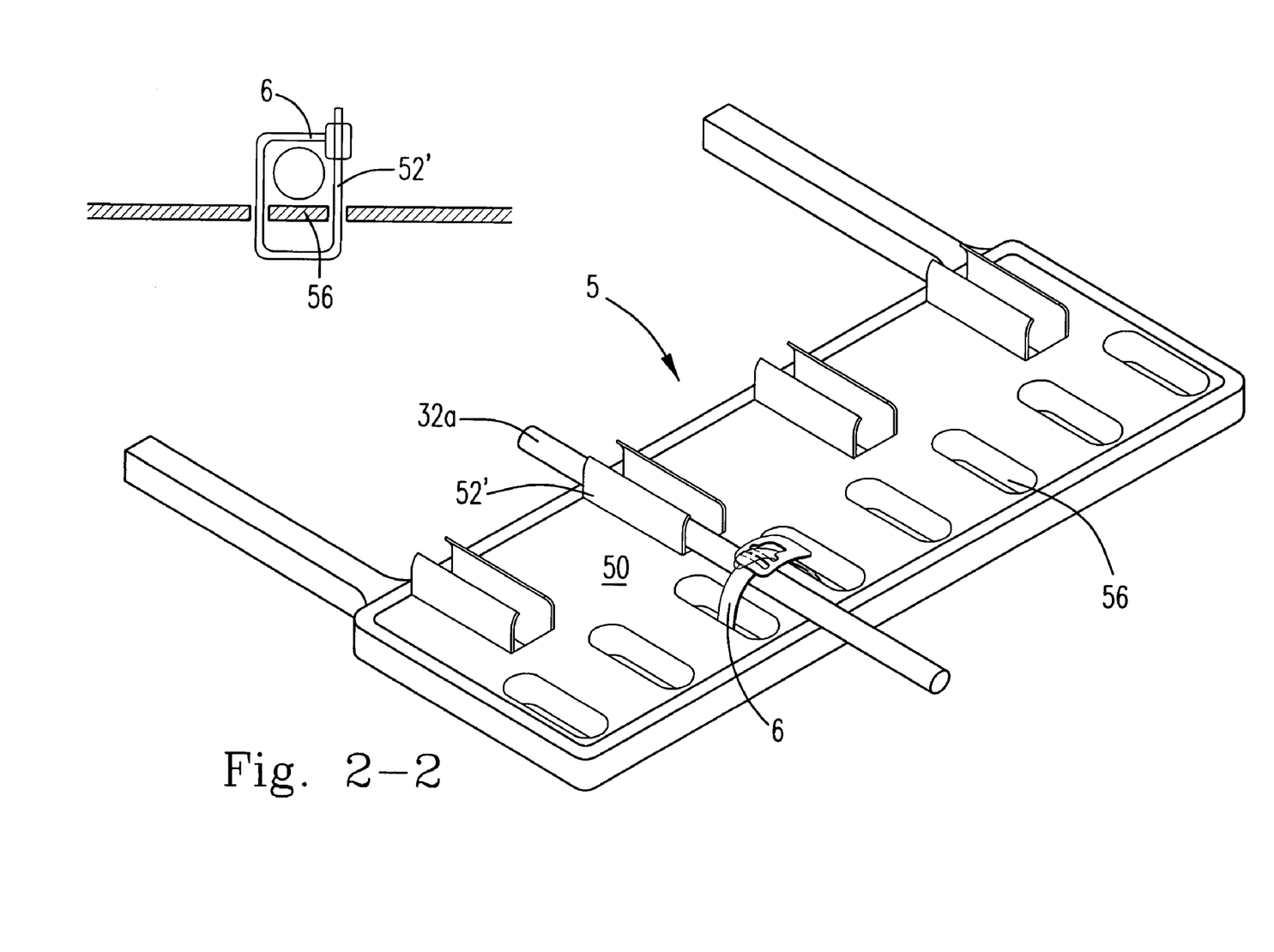

Please refer to FIG. 2-2. FIG. 2-2 is a schematic view showing another cable manager having a fixing aperture according to another preferred embodiment of the present invention. Generally speaking, the fixing apertures 56 are formed in pair with one cable clamping device 52. The fixing apertures 56 are formed at the back or in front of the cable clamping device 52. If the width of the thin cable 32a is thinner than the opening width of the opening 52', the clamping device 52 would be unable to prevent the thin cable 32a from being detached from the space 52" when the thin cable 32a needs to be set on the cable manager 5. Consequently, the purpose of the cable manager is unable to be achieved. Therefore, according to another embodiment of the invention, the thin cable 32a is placed between two fixing apertures 56 and the cable tie 6 ties the thin cable 32a on the body 50 through the fixing aperture 56. Accordingly, the cable manager 5 still achieves the purpose of supporting the cable.

Figure 3:
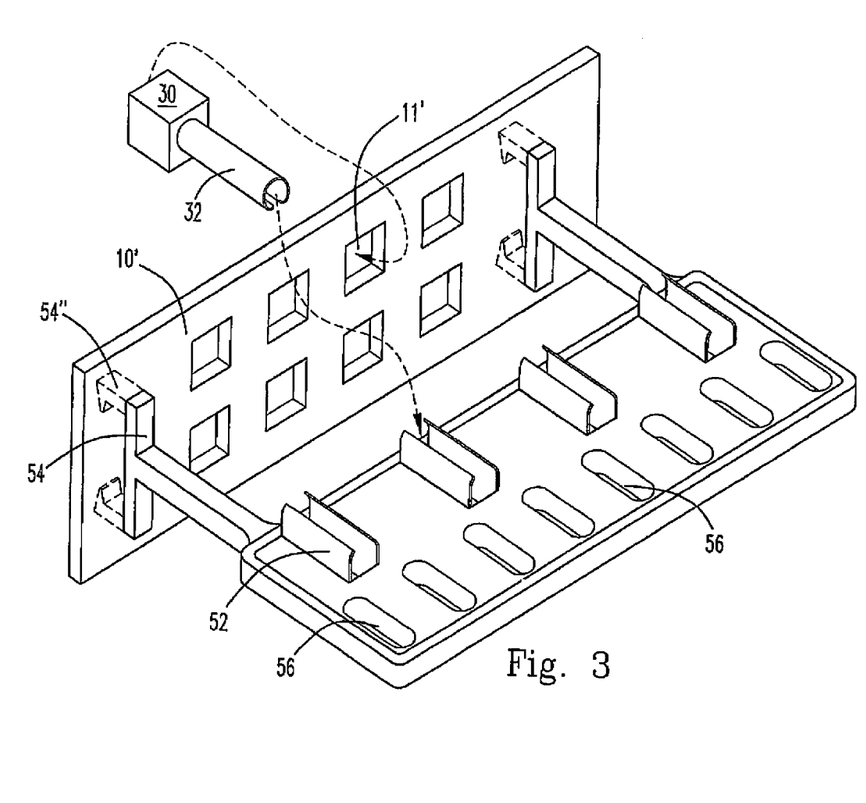
FIG. 3 is a schematic view showing the cable manager combined with the wiring panel according to the present invention.
Figure 23:
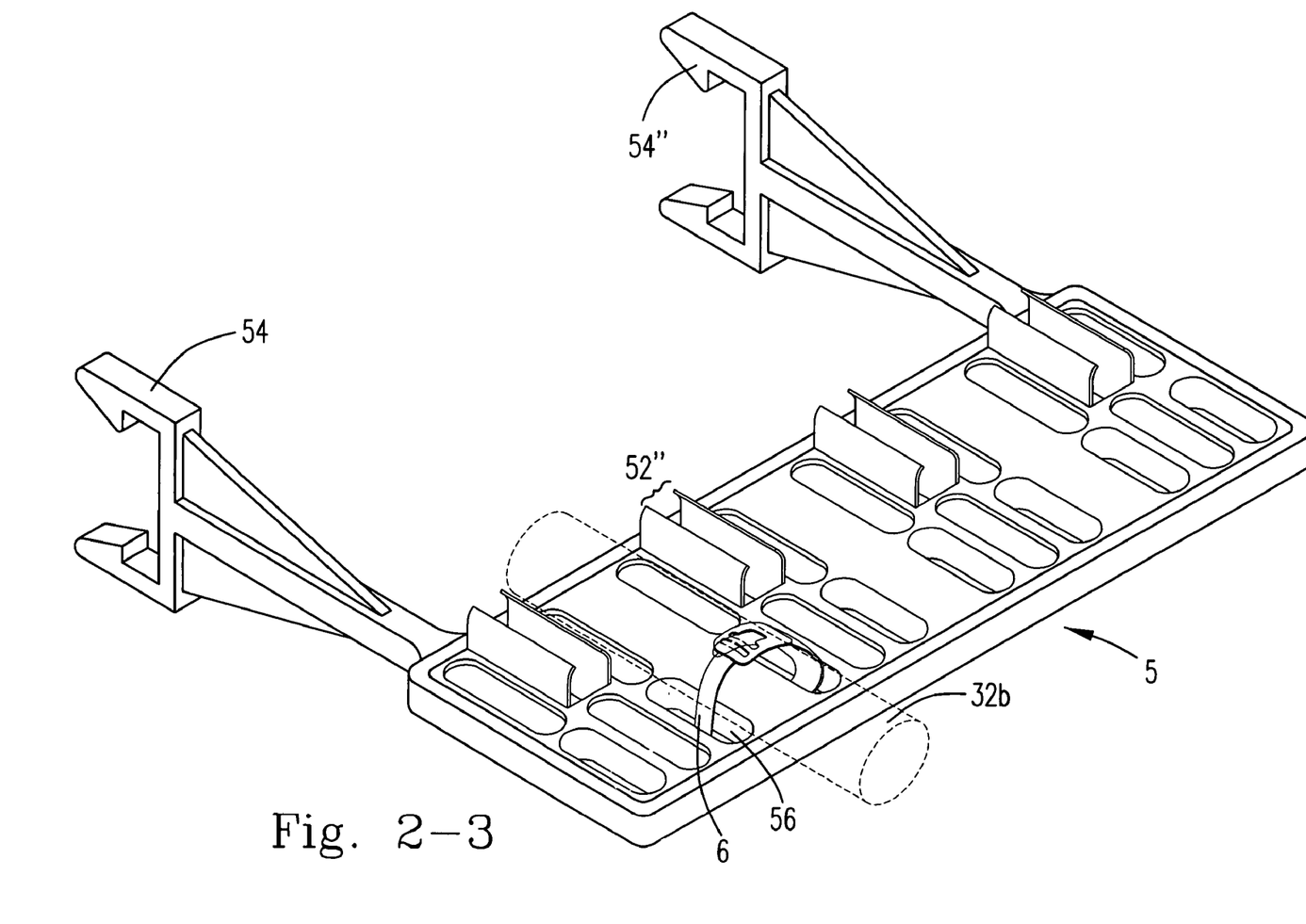

Please refer to FIG. 2-3. FIG. 2-3 is a schematic view showing another cable manager having a fixing aperture according to another preferred embodiment of the present invention. In FIG. 2-3, the thick cable 32b is fixed on the cable manager 5 by the cable tie 6 through the fixing aperture 56. This is because the width of the thick cable 32b is thicker than the reception width of the space 52", and is unable to be placed therein. If the thick cable 32b is forced to be pressed into the space 52", the clamping pieces 520 will be broken. Accordingly, the thick cable 32b is placed between two cable clamping device 52 since the thick cable 32b is too thick to be placed in and clamped by the clamping pieces 520. Furthermore, in FIG. 2-3, the body 50 has a supporting portion 54 which further includes a fixing and engaging device 54" for plugging on the panel 10'. (FIG. 3)

Figure 24:
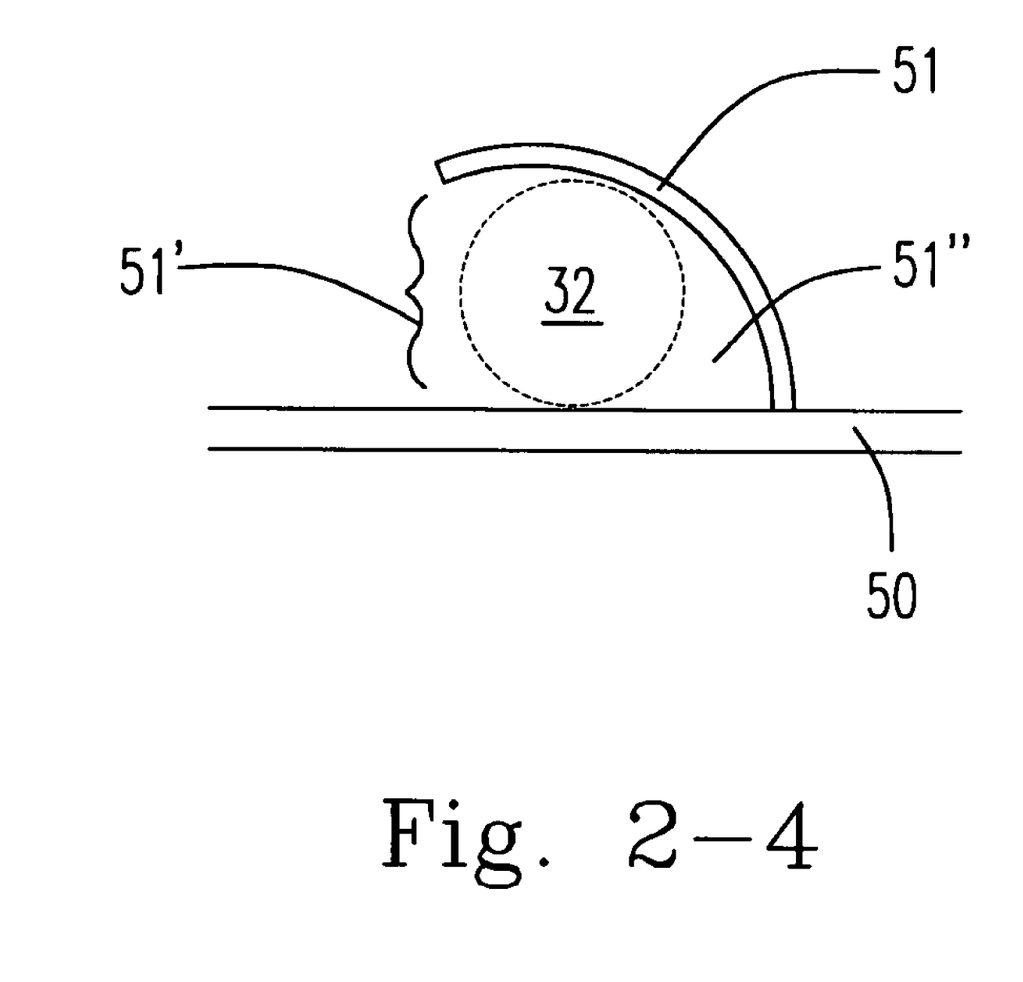

Please refer to FIG. 2-4. FIG. 2-4 is a sectional view showing the cable clamping device having a different clamping piece according to another preferred embodiment of the present invention. FIG. 2-4 is viewed from the back of the cable manager 5. The cable clamping device formed integrally on the body 50 is a single clamping piece 51. The space 51" is formed between the body 50 and the clamping piece 51 and has a opening 51'. The wire portion 32 is also placed into the space 51" through the opening 51'. Therefore, the receiving direction of the opening 51' is parallel to the surface of cable manager 5.

Please refer to FIG. 3. FIG. 3 is a schematic view showing the cable manager combined with the wiring panel according to the present invention. Please refer to FIG. 2-3 together with FIG. 3. The fixing and engaging device 54" is an inclined block or a clasp, and can be plugged into the socket on the panel 10'. The socket is covered by the supporting portion 54 so it is unable to be shown in figures. Therefore, the time for assembling the cable 3 and assembling the panel 10' with the cable manager 5 is shortened. The relationship among the cable clamping device 52, the fixing aperture 56 and the body 50 is similar to what are described above. The wire portion 32 is clamped in the cable clamping device 52 and the connector 30 is placed into the wiring aperture 11'.

Figure 4:
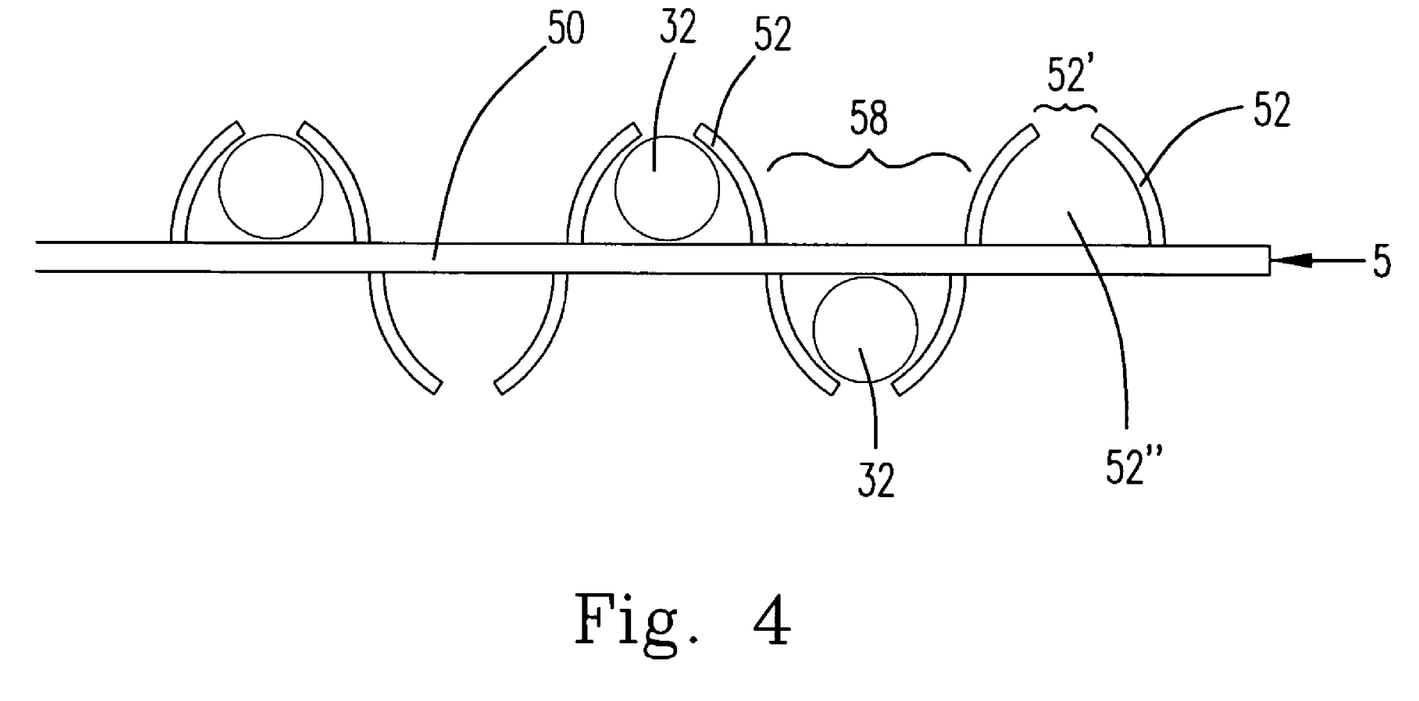
FIG. 4 is a sectional front/back view of the cable manager according to the present invention.

Please refer to FIG. 4. FIG. 4 is a sectional front/back view of the cable manager according to the present invention. There are plural cable clamping devices 52 integrally formed on the body 50 of the cable manager 5. In FIG. 4, the cable clamping devices 52 are placed on two surface of the cable clamping device 52. Between every two cable clamping devices 52 of one surface, the cable manager has one cable clamping device 52 placed at the other surface. In other words, the cable clamping devices 52 are alternately disposed on the two surfaces of the cable manager 5. The cable clamping device 52 has a pair of clamping pieces 520 forming the space 52" and the opening 52'. The wire portion 32 is directly pressed into the space 52". Because the cable clamping device 52 is alternately disposed, an interval 58 is formed between every two cable clamping devices 52. Usually the interval 58 is used for the thick cable 32b disposed thereon. While the quantity of the cable 3 is increased and the cable clamping device 52 is not enough, the cable 3 can be disposed on the interval 58 and tied by the cable tie 6 through the fixing aperture 56 (FIG. 2-3).

While the invention has been described in terms of what is presently considered to be the most practical and preferred embodiments, it is to be understood that the invention is not to be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A cable manager, comprising:
   a cable panel including at least one support opening and at least one cable opening extending therethrough;
   a body having a fixing aperture for receiving therein a cable tie for securing a cable that is to extend through the at least one cable opening in said cable panel;
   at least one support portion extending from said body and comprising a fixing and engaging device for plugging into the at least one support opening for supporting said body; and
   at least one cable clamping device integrally formed on said body and having a pair of clamping pieces forming a space and an opening for receiving the cable, said space having a reception width and said opening having an opening width;
   wherein said opening width is relatively smaller than said reception width.

2. The cable manager according to claim 1, wherein said opening has a receiving direction perpendicular to a surface of said body.

3. The cable manager according to claim 1, wherein said at least one cable clamping device comprises a plurality of cable clamping devices on two different sides of said body.

4. The cable manager according to claim 1, wherein said fixing and engaging device has a barbed end for plugging into the at least one support opening in said cable panel.

* * * * *